Oct. 21, 1958 E. A. FALLIN 2,857,245
METHOD FOR THE PRODUCTION OF DICALCIUM PHOSPHATE
Filed April 16, 1954
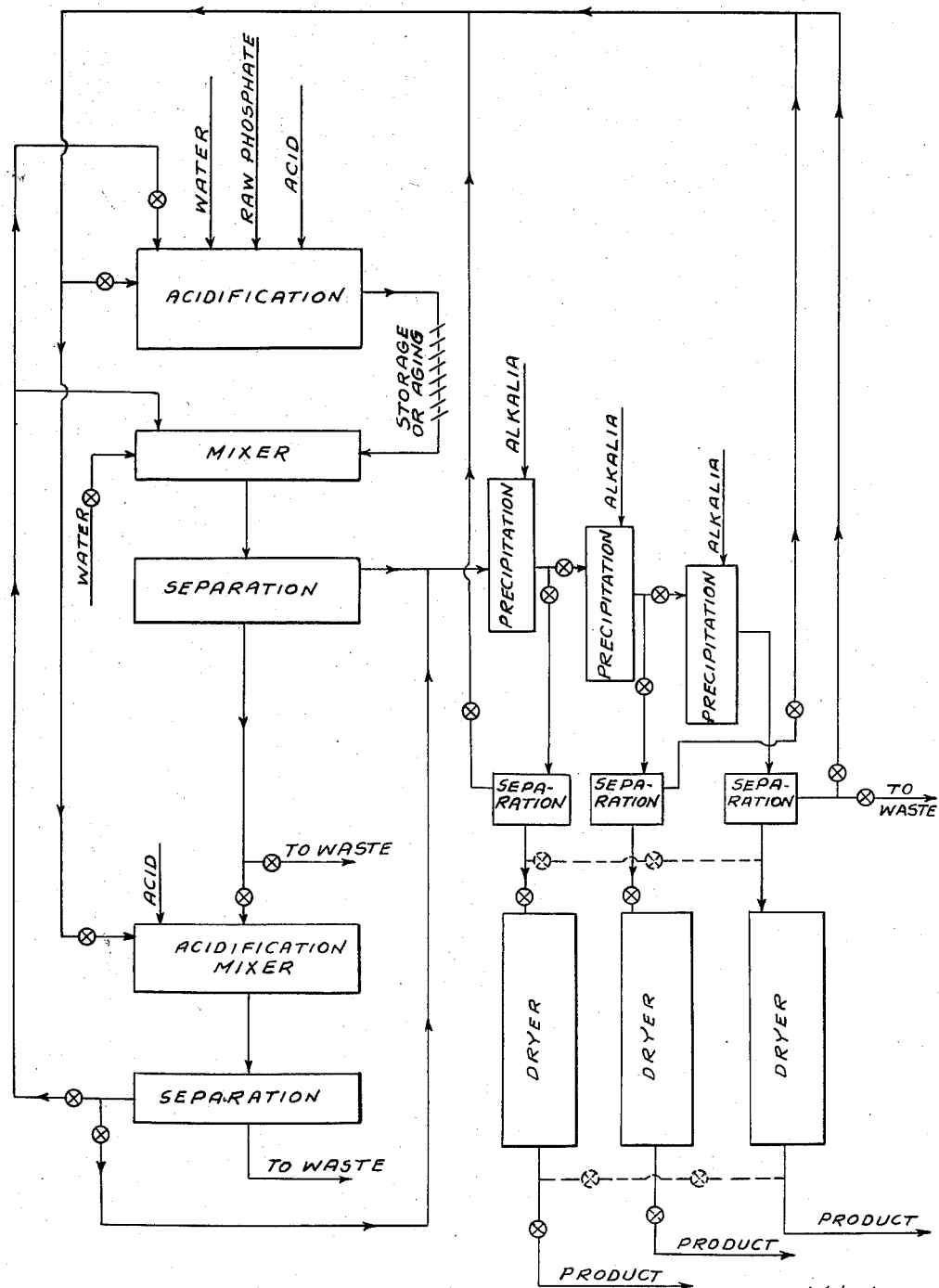
INVENTOR:
EARL A. FALLIN,
BY Kingsland, Rogers & Ezell
ATTORNEYS

United States Patent Office 2,857,245
Patented Oct. 21, 1958

2,857,245

METHOD FOR THE PRODUCTION OF DICALCIUM PHOSPHATE

Earl A. Fallin, Kirkwood, Mo., assignor to Consumers Products Co., Clayton, Mo.

Application April 16, 1954, Serial No. 423,767

11 Claims. (Cl. 23—109)

This invention relates to improvements in methods for producing dicalcium phosphate and, in particular, is concerned with processes for producing dicalcium phosphate of high $P_2O_5$ (phosphorus pentoxide) availability by the use of conventional equipment through the observance of particular process limitations.

It has been found to be of increasing importance in the past few years to obtain concentrated phosphate fertilizers and feeds of high available $P_2O_5$ in order to compete with the increasing demands of agriculture and industry and to meet increased freight and handling expenses. By the obtention of high-$P_2O_5$-availability dicalcium phosphate which reduces dead weight impurities and inert materials, it is possible to greatly reduce freight costs as well as storage space required in the shipment and handling of dicalcium phosphate, which makes possible great economic savings and widens the scope of application of this material to hitherto untouched fields. This dicalcium phosphate may be of varying purity and contain fluorine of varying limits for use in certain fertilizer applications where fluorine content is not a disadvantage, and these fluorine limits may be reduced for feed utilization where fluorine is an undesirable impurity.

In the past, dicalcium phosphate has been conventionally produced from raw phosphate rock, which is reacted with a mineral acid, such as sulphuric acid, to produce phosphoric acid. Various methods and modifications have been utilized to separate the undesirable fluorine, iron, aluminum, magnesium, manganese impurities and silica, which have included a differential alkalizing stage to precipitate the main undesirable fluorine impurity from the phosphoric acid solution.

There are, in conventional practice, two main processes for preparing dicalcium phosphate, which are the so-called wet process and dry process, respectively. In the former, a source material which may be raw phosphate rock is treated with a strong mineral acid to produce phosphoric acid. The resultant phosphoric acid is recovered in solution after the precipitated calcium sulphate or other salts, where different mineral acids are used, is first removed in insoluble form by convenient methods of filtration, decantation, etc. The phosphoric acid so produced is usually of a 20%–30% solution strength, and this is subsequently concentrated to approximately 60% phosphoric acid in evaporators which are lined with lead or other non-corrosive materials, although other methods may be used. This requires bulky and cumbersome, as well as expensive, equipment, and also requires close process control since orthophosphoric acid which is conventionally prepared will be converted into pyrophosphoric acid when the solution is heated above 150° C.

In the so-called dry or thermal process of producing phosphoric acid, an electric furnace may be utilized, which necessitates the location of the plant near an available source of low electrical energy cost. Usually, the raw phosphate rock in this process, which requires a large capital investment, must be sintered or nodulized to facilitate escape of phosphorus vapors in the furnace and to prevent blowing over of dust. Coke breeze and sand are usually added with the charge, and the process is carried out at a very high temperature in the neighborhood of 2400° F.

Two modifications of this dry process exist, one of which is the two-step method that requires cooling of the gases in condensing the phosphorus which is then collected and transferred to separate plants where it is burned to $P_2O_5$ and then reacted with water to produce phosphoric acid. This method permits, if desired, the recovery of carbon monoxide as fuel in the prior condensation stage. The one-step process which has been practiced by the TVA requires that the furnace gases be burned in a tall, packed column with a water spray to form the phosphoric acid. The gases from the tower may then be passed through a Cottrell precipitator to remove any remaining phosphoric acid. An inherent difficulty in this method lies in the formation of the metaphosphoric acid by reaction with the moisture in the air, which results in plugging up the flue and fouling the equipment, as well as corroding the apparatus due to both the $P_2O_5$ and the acid formed. Both $P_2O_5$ and phosphoric acid are very corrosive toward most refractories, especially at high temperatures, which, therefore, represents a very major problem in these processes.

Although the dry process makes possible a phosphoric acid of high concentration and of relatively low impurity, its use in the production of dicalcium phosphate is limited owing to high costs, since very expensive equipment is required both in the furnace stage and then later on in the phosphoric acid production stage. Further, high maintenance and replacement considerations in this process contribute to economical disadvantages, which is further made more acute by the waste of chemical energy resulting from the high input of electrical energy, since a great portion of this energy is not recovered.

In the wet process for reproduction of phosphoric acid, there are also very decided disadvantages which are inherent in the use of multiple effect evaporators which are required to be made of special phosphoric acid and fluorine resistant material, such as lead, stainless steel and other known corrosion-resistant materials of construction. Also, in the wet process, material controls and physical process limitations must be rigidly followed in order to obtain a product of reasonable purity and to filter the solution with any possibility of economical success. Likewise, to prevent the conversion of orthophosphoric acid to pyrophosphoric acid in the concentrating stage, the temperature must be closely controlled.

Various attempts have been made to improve the economic considerations and process controls of the wet process method, since this method may be conveniently practiced anywhere where there is available a supply of mineral acid and raw phosphate rock and, therefore, is not dependent upon a source of cheap electrical energy, as required in the dry process. United States Patent No. 2,013,970 was granted to Moore on a process for producing phosphoric acids and derivatives of the same in which ground phosphate rock is reacted with sulphuric acid to such an extent that the tricalcium phosphate in the rock is converted to monocalcium phosphate in solution and only a minor portion to free phosphoric acid. In this process, the reaction product, which included phosphorus in the form of monocalcium phosphate and calcium as calcium sulphate, is reacted with hydrated lime in a mixer from which calcium sulphate (i. e., gypsum) and other solids, as well as precipitated calcium fluoride, are removed by decantation or filtering at a pH of approximately 4.4, and which inherently will also remove a substantial quantity of phosphorus from the solution as dicalcium phosphate. The separated monocalcium phosphate solution is then treated with lime to convert the monocalcium phosphate to dicalcium phosphate precipitate by adding sufficient lime to raise the pH to a value of 5 to 5.4, which must be rigidly followed by the patentee in order to retain magnesium, manganese and other impurities in solution, such that the dicalcium phosphate may be recovered in substantially pure form. The patentee then proceeds to convert the dicalcium phosphate to orthophosphoric acid by treating with a very concentrated sulphuric acid, which is the primary purpose of the invention. An alternative and preferable treatment of the patentee is to calcine the so obtained dicalcium phosphate to burn off organic matter and fluorine in the course of which is obtained relatively pure pyrocalcium phosphate of around 55% $P_2O_5$. This is then converted to orthophosphoric acid by treatment with strong sulphuric acid. This process inherently involves a high $P_2O_5$ loss and relies on driving out fluorine in the calcining step in order to get a high purity product. In addition, the filtration step is, in practice, quite difficult to follow and is of limited commercial feasibility. There are excessive processing steps and excessive use of sulphuric acid which make questionable the feasibility of the process over the acidulation of the phosphate rock to $H_3PO_4$ in the first place.

Another attempt to improve upon the wet process method for the production of phosphoric acid and dicalcium phosphate has been disclosed by Seyfried in United States Patent No. 2,115,150. In this process, the patentee reacts ground phosphate rock with dilute sulphuric acid in excess so as to obtain all the phosphorus as free phosphoric acid in solution. A particular feature of this invention resides in the use of dilute sulphuric acid in excess in order to obtain easily filterable calcium sulphate crystals from the 15%–25% strength phosphoric acid. To this solution may be added, after separation of calcium sulphate, additional finely ground phosphate rock so as to convert the metallic sulphates in solution to insoluble calcium sulphate while some of the fluorides present are precipitated as insoluble calcium fluoride and calcium silico fluoride ($CaF_2$ and $CaSiF_6$), respectively. This solution, having a pH of 2.5 to 3.5 and containing a mixture of phosphoric acid and monocalcium phosphate which has been separated by decantation or filtration from the insoluble residue, is then passed to a liming tank where milk of lime is added to raise the pH to 3.5 to 4.5, which precipitates some dicalcium phosphate and iron, aluminum and fluorine compounds, which are separated and dried to form a dicalcium phosphate product suitable for use as a fertilizer. The separated solution having a pH of 3.5 to 4.5 is then diluted with water and reacted with calcium fluorocyanide to precipitate iron in the form of ferric-fluorocyanide and other fluorine compounds which may be present. After separation of these precipitated solids, the monocalcium phosphate solution is then reacted with milk of lime to produce relatively pure dicalcium phosphate as a precipitate.

Both the Moore and Seyfried processes, which modify the conventional wet process described above, are objectionable in that fluorine impurities are separated by relatively wasteful procedures in which a substantial amount of phosphate is carried down and lost in the process. Likewise, in carrying out the reaction to the formation of monocalcium phosphate and phosphoric acid, a larger equipment outlay is required and a wasteful amount of acid must be used, which results in a time consuming operation and equipment tie-up in this production process where dicalcium phosphate is ultimately required to be manufactured. Further, in the relatively high pH values employed in the precipitation of the fluorine impurities and in coming back from the acid formation of phosphoric acid, additional lime is lost in the process as well as causing the wasteful removal with the solid precipitate of valuable phosphate material. In addition, the employment of sulphuric acid in large quantities in the acidulation of the phosphate rock is wasteful and uneconomical in that an excess is used to produce some phosphoric acid which ultimately is reconverted by the alkalization procedure.

By means of the present invention, it has been made possible to produce dicalcium phosphate of a controlled purity with the use of conventional and readily available equipment made mostly of standard materials of construction, without the necessity of using expensive evaporators, reaction vessels, filters, or electric furnaces and the like. Further, the materials which are reacted with the raw phosphate rock to produce the dicalcium phosphate are economically and efficiently used, and both the acid and the lime required are at a near minimum in order to obtain optimum efficiencies in the process. By observing careful process limitations and with the use of the simple and conventional equipment required in the method of this invention, the investment and cost for production of the dicalcium phosphate is kept at a very low level, and both the energy supplied as well as the maintenance and replacement of apparatus is greatly reduced.

Briefly, in this process, a phosphate bearing material is reacted with an acid to convert the phosphorous to predominantly monocalcium phosphate in a relatively dry mix which after curing may be dry and friable. This monocalcium phosphate is then taken into solution or dissolved. Most, or at least a desired amount of, waste products and impurities such as calcium sulphate, fluorine and other undesirable components are separated out. The phosphate bearing liquor is then neutralized, heated or otherwise treated to precipitate out the dicalcium phosphate which is filtered and then dried. The filtrate or liquor from this stage, which may be carried out in a plurality of steps, may be recirculated and used in earlier steps of the process, particularly in the step of treating the monocalcium phosphate, or discarded.

The first removed waste may be reacidulated to attain recovery of byproducts or any phosphorus present therein, depending upon the product desired and the control to be exercised. At any rate, very little acid is required, particularly, for instance, if sulphuric acid is the original acid used, as the waste will contain calcium sulphate as the principal ingredient which is more or less inert to additions of further sulphuric acid.

Accordingly, it is an object of this invention to provide a wet process for the production of dicalcium phosphate with a controlled degree of purity, by the use of conventional equipment with a minimum requirement of acid.

It is a further object of this invention to provide a process for the production of dicalcium phosphate in which a phosphate source material is reacted with acid in sufficient quantities to obtain monocalcium phosphate without the production of amounts of phosphoric acid.

It is yet another object of the invention to provide a process for the production of dicalcium phosphate in which sufficient acid is added to a source material to form substantially only monocalcium phosphate and subsequently to remove fluorine and other impurities while adding lime in a controlled amount, so as to maintain the pH within a desired limit and to separate side impurities from the monocalcium phosphate without any substantial loss of phosphate material.

Still another object of this invention is to provide a process for the production of dicalcium phosphate in which a controlled degree of purity of the product may be obtained by recycling various reaction products to the process to obtain maximum recoveries and efficiency.

A still further object of this invention is to provide a process for the production of dicalcium phosphate in which conventional inexpensive equipment is utilized without the necessity of any elaborate outlay and to provide techniques and procedures for obtaining the dicalcium phosphate of a desirable grade which may be varied by observation of specific process limitations and controls.

Other objects and advantages of the invention will further appear to those skilled in the art from the detailed description which follows.

Almost any phosphate bearing material may be used which is of particular advantage because it permits using phosphate rocks of low grade or those relatively high in iron or aluminum. The lower acid requirement (which is to be compared with conventional processes requiring acidulation to phosphoric acid) of this process in the initial stage with further recovery of phosphorous material in later stages, if necessary, makes commercially feasible the use of low grade phosphate rocks, since after the waste is removed, stronger treatment can be given the waste from which the monocalcium phosphate may be preliminarily removed. By differential acidulation increased yields are obtained with higher purities, and frequently most of the calcium phosphate will be acidulated before the more resistant compounds, such as fluorine, iron and aluminum components, since, if the phosphate rock is not acidulated completely in the first stage, many of the more difficult materials are not carried into the end product.

In the initial acidulation stage, the phosphate material is treated so that it ends up as a dry or semi-dry paste-like material or a very thick slurry of quite high viscosity, so that a wider variation of acids of different strengths can be used. Since more dilute liquors are to be used later in the process, exacting pH controls and high ion concentrations are not so important during the initial acidulation in order to get commercially feasible separations of the waste or byproducts, involved in filtering calcium sulphate crystals where sulphuric acid is used to make phosphoric acid.

Further, wide variations in strength of liquors employed are possible in order to control purity, plant capacity and equilibriums encountered in storage and separation procedures. As it is possible to use varying acid strengths at will in the liquor used to dissolve the source material, it has been found that the precipitation of monocalcium phosphate solution to form dicalcium phosphate may be controlled to such slow times of conversion that little $P_2O_5$ is lost in ordinary commercial equipment which may be feasibly used in this process.

The phosphate bearing liquor once obtained may be acidulated to phosphoric acid under easily controlled conditions so as to have the proper ion concentration or for controlling the build-up of calcium sulphate crystal size for easy filtration, which is made more advantageous because most of the impurities have been separated in an earlier stage.

Further, the phosphate may be recovered as dicalcium phosphate without large expenditures for alkali, since the dicalcium phosphate may be caused to precipitate by increasing the temperature of the solution through taking advantage of the so-called negative temperature solubility of dicalcium phosphate. The remaining liquor will contain a rather pure weak phosphoric acid which may be used for other purposes, but is of particular advantageous employment in recirculation to dissolve more monocalcium phosphate in the initial stage.

If it is preferred, the phosphorous bearing liquor may be precipitated to give dicalcium phosphate by the incremental addition of alkalies, such as ammonia or nitrogen liquors, bases such as sodium and potassium hydroxide, calcium compounds such as CaO, $CaCO_3$, and the like. When ammonia sodium and the more soluble alkali ions are used, the corresponding phosphates may be recirculated through the process before or after calcium sulphate is first removed, in order to prevent waste of alkaline material and make most efficient use of the materials added to the process.

The dicalcium phosphate, however formed, may be thickened, decanted or filtered and dried artificially or naturally, or acidulation with acids such as phosphoric acid may be subsequently executed, preferably with the addition of further components such as potassium, calcium, or even rock phosphate to modify or vary the end product. The dicalcium phosphate before or after filtration or drying can be acidulated into monocalcium phosphate or phosphoric acid by adding phosphoric acid or other acids if such acid-high products are desired, with a lessened capital investment required in the production of these end products. Such secondary acidulation to monocalcium phosphate or phosphoric acid has advantage in the production of phosphoric acid as less expensive equipment is used in the original stages and the separation steps, since not all the waste product has to be taken through the monocalcium phosphate to phosphoric acid. As indicated previously, this would produce a more pure phosphoric acid or monocalcium phosphate without the requirement of concentration through evaporation.

Another distinct advantage is that the above referred to waste products can more easily be used for useful byproducts. For example, the low $P_2O_5$ fertilizer can be used alone or for mixing with commercial fertilizer or a low phosphorous fertilizer for distribution to local areas where the amount of dead weight inert material is not economical drawback and does not cause loss in shipping costs. Conversely, if maximum recovery is desired, this waste which is mostly inert to further acid treatment can yield phosphorous compounds with use of very little acid, so as to increase the yield of the process.

Also, easy recovery of byproducts in the waste material is made possible, such as compounds available in such small amounts in the original material as not to be feasible for recovery directly. These are recoverable in the waste of the process of this invention with expenditure of a small amount of acid.

The raw materials used in carrying out the process of this invention may be rock phosphate which is largely apatite $3Ca_3(PO_4)_2 \cdot CaF_2$ and the reactions involved may be largely considered as involving $Ca_3(PO_4)_2$ and $CaF_2$. The exact structure of rock phosphate is not known, due to many varying impurities, and since this process will work with almost any phosphatic material the following expressions may be considered as exemplifying the chemistry involved in the reactions.

(1) $Ca_3(PO_4)_2 + 2H_2SO_4 = CaH_4(PO_4)_2 + CaSO_4$
(2) $CaF_2 + H_2SO_4 = 2HF + CaSO_4$
(3) $2FePO_4 + 3H_2SO_4 = Fe_2(SO_4)_3 + 2H_3PO_4$
(4) $2AlPO_4 + 3H_2SO_4 = Al_2(SO_4)_3 + 2H_3PO_4$
(5) $CaCO_3 + H_2SO_4 = CaSO_4 + CO_2 + H_2O$

By controlling the variables of concentration, temperature and time involved in the process, the reactions can be effected with more or less impurities being extracted in final byproduct recovery stages. Further, certain substances can be added such as silica which will cause more fluorine to come off as a gas vapor. For example, the HF formed in Equation 2 can react as follows:

(6) $4HF + SiO_2 = SiF_4 + 2H_2O$

Also by controlling the time the sulphuric acid and raw phosphate mix is allowed to stand before extraction of the monocalcium phosphate the formation of $H_2SiF_6$ can be effected. For instance, it takes time for the following reaction to take place:

(7) $3SiF_4 + 2H_2O = SiO_2 + 2H_2SiF_6$

There are many procedures and variations in this process which can be applied to vary the amount of impurities (particularly fluorine and its compounds) in the more or less dry mix procedure involved in this invention which are not possible in the old wet process methods. For instance, the amount of fluorine in the mix of this invention which is predominantly dry is effected by the concentration of the acid used and the temperature maintained during acidulation. Since some phosphatic material may be recirculated in the later stages in the process, Equations 2, 3 and 4 and perhaps even 5 will apply to reactions involved in this recirculation stage with an additional equation as follows:

(8)  $CaHPO_4 + H_2SO_4 = CaSO_4 + CaH_4(PO_4)_2$

Most of these equations will apply where the phosphate material is in minor amounts in the reclamation of by-products and phosphorous from the waste previously referred to. While these examples are given using sulphuric acid which is the most convenient and economical acid to use, it is obvious that by simple modifications other acids may be used such as phosphoric, nitric and hydrochloric.

In the extraction stage, which is practiced upon the relatively dry reaction mix, the monocalcium phosphate $CaH_4(PO_4)_2$ is dissolved in water and thereby carried away from the waste. This solution, in the process carried out in this invention, is in or near equilibrium, wherein dicalcium phosphate, $CaHPO_4$, and other solid compounds can be caused to settle out with proper equipment design and recovered with predominantly dicalcium phosphate when working in weak solutions. However, it is more practical to heat this predominantly monocalcium phosphate solution so that dicalcium phosphate is more rapidly precipitated, in accordance with the equation below:

(9) 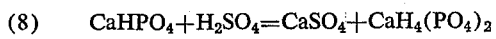
$$CaH_4(PO_4)_2 + (X)H_2O \xrightarrow{heat} CaHPO_4 + (x-1)H_2O$$

When this solution is kept warm, the dicalcium phosphate can be separated and then the predominantly weak phosphoric acid solution remaining of some monocalcium and dicalcium phosphate in equilibrium can be recirculated to the extraction step. From the above description, it is obvious that the practical operating limits may be varied. For example, at times such high amounts of water may be used in extracting the monocalcium phosphate from the predominantly dry mix that the specific gravity of the solution is as low as 1.005, which is less than ½% available $P_2O_5$ in solution. In such solutions, dicalcium phosphate may be precipitated with lime or by the application of heat, and recovered.

It is believed that in these extreme weak solutions there are more problems of preventing formation of hydroxy-apatite, i. e., $3Ca_3(PO_4)_2 \cdot Ca(OH)_2$. However, normally the optimum operation is finished when the specific gravity of the solution, after removal of the dicalcium phosphate, is in the neighborhood of 1.005. It has been found that the specific gravity is most favorable in the execution of this operation when the ratio of monocalcium phosphate to extracting liquor is so great that the specific gravity of the clear solution does not exceed 1.25. However, in the cases of higher specific gravity, there are encountered more impurities and corrosive effects with increased work required for separation of wastes, and it is therefore preferred that the practical operating procedure be in the neighborhood of a specific gravity of somewhere around 1.15. By using a plurality of stages for the addition of alkali, local concentrations of calcium ion build up are prevented which inhibits the formation of undesirable hydroxy-apatite and makes possible the obtention of dicalcium phosphate of more uniform and larger crystal size. This enhances the ultimate separation and recovery and facilitates filtration.

Another advantage of this process is that, not only can the concentration, temperature and time be varied for control of purities, but when working in more dilute solutions, a more efficient separation of the solids from the liquor and less control observance is required. On the other hand, the process depends upon a sufficient amount of liquid being used to give practical separation of the monocalcium phosphate from the waste. Further, the solution should be dilute yet low enough in pH to prevent excessive amounts of dicalcium phosphate and other solid phosphates from precipitating into the waste before separation is effected. When the concentrations of $P_2O_5$ are in the higher ranges, as 30 to 35%, high amounts of phosphoric acid in the extracting liquor are necessary in order to prevent the precipitation of dicalcium phosphate.

The process may further be controlled by keeping the pH within desired limits which obviates the necessity of making complete chemical analyses at the various stages of the process, and it is to be desired that the pH in the monocalcium phosphate solution be maintained between 2 and 3. Obviously, this pH is lower when greater amounts of phosphoric acid are in the extracting liquor, or otherwise greater concentrations of $P_2O_5$ are present, and when the dicalcium phasphate is removed by heating and the phosphoric acid content is allowed to build up by numerous recirculation procedures before the dicalcium phosphate is precipitated. Further, this pH will vary with the concentration of $P_2O_5$ in the solution, and when the phosphate liquor has a specific gravity of 1.15 the pH may be in the neighborhood of 2½; whereas a phosphate liquor having a specific gravity of 1.005 may have a pH of over 3.

It has been found that dicalcium phosphate has a negative temperature coefficient of solubility and that the conversion from monocalcium phosphate increases with increased temperatures as given in the table below:

| Temperature, Degree C. | Grams $H_2O$/ 100 Grams Monocalcium Phosphate | Percent Conversion of Monocalcium Phosphate to Dicalcium Phosphate |
| --- | --- | --- |
| 25 | 98 | 57 |
| 50 | 62 | 68 |
| 75 | 42 | 74 |
| 100 | 28 | 79 |

Reference is now had to the drawing showing, for the purpose of illustration, a flow sheet for the flow of materials in the method used in this invention. It is to be understood that this is only one example of this invention and that various modifications may be made therein as will appear to those skilled in the art.

A typical charge to the process may be raw phosphate rock, water and a mineral acid such as sulphuric acid of 60° Baumé, i. e., 77.67% $H_2SO_4$, which is reacted in ordinary superphosphate equipment. In order to insure a more complete reaction, the reacting materials may be left in the reactor for a number of hours, in the course of which the temperature of the mass can rise to above 100° C. and carbon dioxide steam and gaseous compounds that form will escape. In this primary reaction, a goodly portion of fluorine containing vapor can be caused to be removed which lessens the equipment tie-up, etc., required in removing the fluorine in the reaction product that may be desired to be removed later. The reaction product which is maintained in a form of a paste is then charged to a mixer which insures that all of the particles are thoroughly mixed with liquid from which it is then passed to a blender at which stage water may be added, in the course of which the pH is maintained at a level of 2.5 to 3 such that when the first portion of dicalcium phosphate precipitates the raise in pH is stopped. This point is easily determined by observation. If required, effluent liquor from a later stage of the process may be added in either the mixer and blender to control and keep the pH within the desired level.

From the blender, the material is then conducted to a first separating tank or filter. In the separating tank or filter, solid impurities which comprise gypsum (calcium sulphate), iron, aluminum and fluorine compounds are removed and conducted to a mixer, to which additional acid may be added. The resulting solution from the mixer, together with some impurities, is then conducted to another separating tank from which the effluent liquor is conducted back to the system, if desired. This liquor will contain a substantial portion of monocalcium phosphate in solution which was carried down with the fluorine and gypsum impurities from the first separating tank aforementioned.

The effluent liquor from the first separating tank, together with the monocalcium phosphate in solution from the second separating tank, may be added together to a first precipitating tank, to which lime is added so as to raise the pH a slight degree of more alkalinity between 2.5 to 3.25 which causes a slight amount of precipitation of dicalcium phosphate and which is critical within this range. The amount added is substantially the equivalent of the stoichiometric quantity required to react with the fluorine present. In this precipitation, which is effected by the addition of lime or, if desired, calcium carbonate, in which event the reaction and neutralization is slower, or other alkaline agents as described above, fluorine is precipitated as calcium fluoride. Alternatively, an ion exchange process may be used to remove the fluorine or suitable adsorbents may be added for this purpose.

Where partial neutralization is used, the resulting mixture of solution and solids is subjected to a filtration process where the solid materials separated in the filtration procedure are at an analysis such that appreciable $P_2O_5$ is present with the precipitated fluorine and other impurities. Recycling of the solids to the super phosphate reactor may then be provided in order to recover the phosphate material. If and when, however, the fluorine builds up to such an extent that it is too high compared to the phosphate strength in proportion, this may be let out to waste, sold as such, or used in fluorine recovery procedures. Alternatively, if a product is desired in which fluorine is not objectionable, nearly all the phosphate may be converted to dicalcium phosphate by raising the pH to about 5.5 or 6 in the first precipitating tank and the solids separated from the first filter may be conducted to a drier or kiln, in which the fluorine content will be of the order of about 0.2% to 0.5%. The product is then ready for subsequent use as feed fertilizer or other material in which this fluorine content is not objectionable.

Alternatively, the dicalcium phosphate may be obtained by using multiple precipitating stages allowing the solids and liquor from each stage to flow into the next, separating the solids only at the last stage. Similarly, a batch procedure is performed by gradually precipitating the phosphate by neutralizing or heating the liquor in small increments until completed; then the solids separated.

In the first-mentioned multiple stage process the filtrate from the first filter when the pH was limited to 2.5–3.25 is then conducted to a second precipitating tank in which additional lime, for instance, is added to bring the pH to a level of 4.5 to 5.5, depending on the final product required and equipment available for separating and drying. This will precipitate the main share of the $P_2O_5$ in solution as dicalcium phosphate which may then be separated from the solution by a filtration or decantation procedure as previously described. In the second filter, the solids are then removed and conducted to a second drier or kiln. This product may be dried to dicalcium phosphate dihydrate, which analyzes about 18% phosphorous, or to anhydrous dicalcium phosphate, which analyzes 22.4% phosphorous corresponding to 51% $P_2O_5$. This product will have a fluorine content analyzing below .1% and is suitable for feed products as well as fertilizer use.

The filtrate from the second filter may, if a product very low in fluorine is desired, be conducted to a third precipitating tank in which lime is added to bring the pH to 6.5 or 7.0, i. e., absolute neutrality, whence the remaining phosphate will be precipitated as dicalcium phosphate and conducted to a drier or kiln and recovered in the same manner discussed above. Alternatively, the dicalcium phosphate from the third filter may be dried in the second drier or kiln in which the main bulk of the dicalcium phosphate is recovered in order to increase the purity of this product.

Further, all of the precipitates going into the three different driers may be combined in any manner to obtain a product of the desired purity. The filtrates or the liquor left from separating out the precipitates, if not desired for further precipitation or recovery of products, may be re-circulated to the first part of the process to be used as water or liquor for diluting the original acid, diluting the acidulated mass in the blender or discarded.

As an actual example, the following charge may be used in the flow sheet above described:

| | Pounds |
|---|---|
| Phosphate rock | 3120 |
| Sulphuric acid—77.67% | 2370 |
| Water | 90 |

To this charge may be added the filter cake from the first filter which contains the precipitated fluorine and some $P_2O_5$ containing material. The amount of filter cake so recirculated can be varied depending upon the ultimate purity desired of the product which is to be removed. When the fluorine content builds up to undesirable quantities it is then discharged from the process. The resulting mix before or after storage is then conducted through the mixer and blender in which approximately four parts of water to each part of mix is added by weight. The charge is then conducted through the various separating and precipitating procedures with the particular observation of the pH controls by appropriate addition of lime to bring the solutions to the required acid condition. The product ultimately recovered may all be obtained from the second drier, since no low purity or high purity dicalcium phosphate may be desired, and this product is in the amount of about 900 to 980 pounds, having a fluorine content of about 0.2% with substantially 22% phosphorous when in the anhydrous product.

It is obvious from the above description that certain variations and modifications may be made of the process of this invention without varying from the scope thereof. For instance, other mineral acids such as nitric, phosphoric and hydrochloric acid may be used besides sulphuric acid. And, if desired, waste or spent sulphuric acids from petroleum processes can be used to increase the economical benefits without disadvantage in the process, such as may be the case in the ordinary or modified wet process. Where using such waste acids which contain organic matter, a precipitation of these impurities is avoided, since the pH can be kept below the level of 6.5, at which point it is known that such organic materials become troublesome and cause discoloration of the product. Other recycling and recovery techniques may be used which will appear obvious to those skilled in the art, and, accordingly, it is desired that this invention be limited only by the scope of the appended claims.

What is claimed is:

1. In a process for producing dicalcium phosphate from a material containing fluorine impurities prepared by reacting phosphate rock with acid selected from the group consisting of sulphuric, phosphoric, nitric and hydrochloric and a diluent comprising water to convert said phosphate rock to a plastic state, the proportions of rock and acid being such that formation of phosphoric acid is suppressed, the steps of adding a diluent comprising water thereto to raise the pH to a value of about 2.2 to 3.0 to allow separation of a precipitate containing impurities, and any insoluble calcium salt of the acid, removing said precipitate from the liquor resulting from said last step, adding an alkaline agent to the liquor to raise the pH to about 2.5 to 3.25, so as to cause separation of fluorine containing impurities without substantial formation of dicalcium phosphate, withdrawing the impurities from the liquor, heating said liquor to precipitate at least a portion of said dicalcium phosphate and removing said precipitated dicalcium phosphate and recovering the same.

2. In a process for producing dicalcium phosphate from a material containing fluorine impurities, prepared by reacting phosphate rock with acid selected from the group consisting of sulphuric, phosphoric, nitric and hydrochloric and a diluent comprising water to convert said phosphate rock to a plastic state, the proportions of rock and acid being such that formation of phosphoric acid is suppressed, the steps of adding a diluent comprising water thereto to raise the pH to a value of about 2.2 to 3.0 to form a liquor containing the impurities and any solid calcium salt of the acid and removing said solids from the liquor resulting from said last step, adding an alkaline agent to the resultant liquor to raise the pH to about 2.5 to 3.25 so as to cause separation of fluorine containing impurities without substantial loss of dicalcium phosphate, withdrawing the impurities from the liquor, adding an alkaline agent to said liquor having a pH of about 2.5 to 3.25 in at least two additional stages to raise the pH about 1 point in each of said two additional stages to precipitate dicalcium phosphate, and recovering the precipitated dicalcium phosphate.

3. In a process for producing dicalcium phosphate from a material containing fluorine impurities, prepared by reacting a calcium phosphate containing material with acid selected from the group consisting of sulphuric, phosphoric, nitric and hydrochloric and water in such proportions as to obtain a monocalcium phosphate while suppressing formation of phosphoric acid, the steps of adding a diluent comprising water thereto and maintaining the pH to a range of about 2.2 to 3.0, to form a precipitate containing the impurities, any calcium salt of the acid, and some phosphate material, removing said precipitate from the liquor resulting from said last step, moderately acidifying said precipitate to dissolve the phosphate material contained therein without dissolving substantial quantities of said fluorine materials and recycling the liquid effluent as at least part of the diluent to the process and subsequently recovering dicalcium phosphate therefrom.

4. In a process for producing dicalcium phosphate from a material containing fluorine impurities, prepared by reacting a calcium phosphate containing material with acid selected from the group consisting of sulphuric, phosphoric, nitric and hydrochloric and a diluent comprising water to convert said phosphate material to a plastic state, the proportions of rock and acid being such as to suppress the formation of phosphoric acid, the steps of adding a diluent comprising water thereto to raise the pH to a value of about 2.2 to 3.0 to form a liquor containing any solid calcium salt of the acid and fluorine compounds, removing said precipitate from the liquor resulting from said last step, moderately acidifying said precipitate an amount sufficient to dissolve dicalcium phosphate contained therein without appreciably dissolving said calcium salt and fluorine compounds, and recycling the liquid effluent to the liquor in said process, adding an alkaline agent to said liquor having a pH of about 2.2 to 3.0 in at least two additional stages to raise the pH about 1 in each of said additional stages, removing precipitated dicalcium phosphate from the liquor, drying the precipitated dicalcium phosphate, and adding said liquor to an earlier stage in the process to recover phosphate values.

5. In a process for producing dicalcium phosphate from a material containing fluorine impurities, prepared by reacting phosphate containing rock with concentrated sulphuric acid and a diluent comprising water in an amount approximately the stoichiometric requirement for conversion to monocalcium phosphate and to convert said rock to an initial plastic state and insufficient to form any appreciable phosphoric acid, the steps of diluting said reaction product to a pH of about 2.0 to 3.0 by the addition of an aqueous agent, separating out primarily precipitated calcium sulphate and other impurities from said reaction product and leaving a liquor containing monocalcium phosphate and some fluorine impurities in solution, adding a calcium containing base thereto and adjusting the pH of said liquor to about 2.5 to 3.25 at the point where dicalcium phosphate first begins to precipitate out, to precipitate fluoride containing compounds and a minor amount of dicalcium phosphate, removing said last named precipitates from the liquor, recycling said removed precipitates by introducing the same into an earlier stage of the process until the fluorine compounds in said precipitate build up to an undesirable amount at which time said precipitate is removed, and taking said last named liquor and adding additional quantities of a calcium containing base to precipitate relatively pure dicalcium phosphate therefrom.

6. In a process for producing dicalcium phosphate from a material containing fluorine impurities, prepared by reacting calcium phosphate containing material with an acid selected from the group consisting of sulphuric, phosphoric, nitric and hydrochloric, and water in an amount approximately the stoichiometric requirement for conversion to monocalcium phosphate and to convert said phosphate material to an initial plastic state and insufficient to form any excess phosphoric acid, the steps of diluting said reaction product by the addition of a liquid diluent to a pH of about 2.0 to 3.0, to form a precipitate including fluorine impurities, separating out any precipitated calcium salt of the acid and other impurities from said reaction product and leaving a liquor containg monocalcium phosphate and some fluorine in solution, adding a base thereto to obtain a pH range of 2.5 to 3.25, to the point where dicalcium phosphate first begins to precipitate, to precipitate fluoride containing compounds and at most a minor amount of dicalcium phosphate, removing said last named precipitates from the liquor, and taking said last named liquor and adding a base thereto in a plurality of additional stages including at least two stages to raise the pH in increments and to adjust the final pH to a value not to exceed about neutrality, and separating from said liquor precipitated dicalcium phosphate.

7. In a process for producing dicalcium phosphate from a material containing fluorine impurities, prepared by reacting calcium phosphate containing material with concentrated sulphuric acid and water in an amount approximately sufficient to supply the stoichiometric requirement for conversion to monocalcium phosphate and to convert said rock to an initial plastic state and insufficient to form any appreciable phosphoric acid, the steps of diluting said reaction product by the addition of a liquid diluent to a pH of about 2.0 to 3.0, separating out primarily precipitated calcium sulphate and other impurities from said reaction product and leaving a liquor containing monocalcium phosphate and some fluorine in solution, adding a calcium containing base thereto to raise the pH to from 2.5 to 3.25, to the point where dicalcium phosphate first begins to precipitate, to precipitate fluoride containing compounds and a minor amount of dicalcium phosphate, removing said last named precipitates from the liquor, taking said removed precipitates and drying the same for recovery of dicalcium phosphate for use in impure form, and taking said last named liquor and adding a calcium containing base thereto in a plurality of additional stages including at least a second stage to adjust the pH to a value not to exceed about neutrality, and separating from said liquor precipitated dicalcium phosphate.

8. In a process for producing dicalcium phosphate from a material containing fluorine impurities prepared by reacting phosphate containing rock with concentrated sulphuric acid and water in an amount approximately sufficient to supply the stoichiometric requirment for conversion to monocalcium phosphate and to convert said rock to a plastic state and insufficient to form any appreciable phosphoric acid, the steps of diluting said reaction product by the addition of a liquid diluent to a pH of about 2.0 to 3.0, separating out primarily precipitated calcium sulphate and other impurities from said reaction product and leaving a liquor containing monocalcium phosphate and some fluorine in solution, adding a base thereto in a first stage to adjust the pH of said liquor to about 2.5 to 3.25 at the point where dicalcium phosphate first begins to precipitate out, to precipitate fluoride containing compounds and a minor amount of dicalcium phosphate, removing said last named precipitates from the liquor having a pH of about 2.5 to 3.25, and taking said last named liquor and adding a calcium containing base thereto in a second stage to raise the pH about one point and thereby precipitate a second precipitate of dicalcium phosphate in more pure form than the first stage, adding to said liquor in a third stage additional amounts of a calcium containing base to raise the pH about one point and thereby precipitate a third precipitate of dicalcium phosphate in substantially pure form, separating said precipitate from the second and third stages and recycling at least a portion of the liquor from said third step for use in an earlier step to raise the pH therein.

9. The process of claim 5 wherein the diluting of the reaction product is controlled to yield a specific gravity of about 1.005 to 1.25.

10. In a process for producing dicalcium phosphate from a material containing fluorine impurities prepared by reacting calcium phosphate containing material with concentrated sulphuric acid and water in an amount approximately sufficient to supply the stoichiometric requirement for conversion to monocalcium phosphate and to convert said rock to a plastic state and insufficient to form any appreciable phosphoric acid, the steps of diluting said reaction product by the addition of a liquid diluent to a pH of about 2.0 to 3.0, separating out primarily precipitated calcium sulphate and other impurities from said reaction product and leaving a liquor containing monocalcium phosphate and some fluorine in solution, adding a calcium containing base thereto in a first stage to adjust the pH to 2.5 to 3.25, to the point where dicalcium phosphate first begins to precipitate out, to precipitate fluoride containing compounds and at most a minor amount of dicalcium phosphate, removing said last named precipitates from the liquor, and taking said last named liquor and adding additional quantities of a calcium containing base to precipitate relatively pure dicalcium phosphate therefrom, separating said precipitated dicalcium phosphate after each of said stages, and subsequently acidulating a portion of the separated dicalcium phosphate for converting the same to phosphoric acid and recovering said acid.

11. The process of claim 3, together with the steps of alkalizing the liquor obtained from the dilution step to a pH of about 2.5 to 3.25, further precipitating fluorides therefrom, and recovering the phosphate salt of the alkali.

References Cited in the file of this patent

UNITED STATES PATENTS

| | | |
|---|---|---|
| 1,826,785 | Holz | Oct. 13, 1931 |
| 1,849,704 | Boller | Mar. 15, 1932 |
| 2,115,150 | Seyfried | Apr. 26, 1938 |
| 2,164,627 | Seyfried | July 4, 1939 |
| 2,287,264 | Ogburn | July 23, 1942 |
| 2,312,047 | Ogburn | Feb. 23, 1943 |
| 2,384,773 | Shoeld | Sept. 11, 1945 |
| 2,728,635 | Miller | Dec. 27, 1955 |

FOREIGN PATENTS

| | | |
|---|---|---|
| 336,692 | Great Britain | Oct. 30, 1930 |